United States Patent [19]

Reichert

[11] Patent Number: 4,926,289

[45] Date of Patent: May 15, 1990

[54] ACTIVELY SHIELDED, SUPERCONDUCTING MAGNET OF AN NMR TOMOGRAPHY APPARATUS

[75] Inventor: Thomas Reichert, Erlangen, Fed. Rep. of Germany

[73] Assignee: Siemens Aktiengesellschaft, Berlin and Munich, Fed. Rep. of Germany

[21] Appl. No.: 218,210

[22] Filed: Jul. 13, 1988

[30] Foreign Application Priority Data

Jul. 17, 1987 [DE] Fed. Rep. of Germany ....... 3723741

[51] Int. Cl.$^5$ .......................... G01R 33/20; H01F 7/22
[52] U.S. Cl. ..................... 361/141; 324/319; 335/216; 505/844; 505/879; 505/880; 336/DIG. 1
[58] Field of Search .................. 361/19, 141; 335/216; 336/DIG. 1; 174/125.1; 357/83; 307/100, 541, 245, 306, 277; 324/313, 318, 319, 320, 322; 323/360; 505/844, 850, 851, 856, 857, 861, 863, 864, 865, 870, 875, 879, 880

[56] References Cited

U.S. PATENT DOCUMENTS

| 2,978,664 | 4/1961 | Walters | 338/217 |
|---|---|---|---|
| 3,466,504 | 9/1969 | Hart, Jr. | 361/19 |
| 3,839,689 | 10/1974 | Biltcliffe et al. | 335/216 |
| 4,237,507 | 12/1980 | Meierovich et al. | 361/19 |
| 4,559,576 | 12/1985 | Ries | 361/19 |
| 4,680,666 | 7/1987 | Rios | 361/141 |

FOREIGN PATENT DOCUMENTS

| 0167243 | 1/1986 | European Pat. Off. . |
|---|---|---|
| 0211551 | 2/1987 | European Pat. Off. . |
| AS1614964 | 5/1970 | Fed. Rep. of Germany . |
| OS1764369 | 4/1971 | Fed. Rep. of Germany . |
| OS2301152 | 7/1973 | Fed. Rep. of Germany . |
| 2125632 | 3/1984 | United Kingdom . |

OTHER PUBLICATIONS

"Considerations In the Design of MRI Magnets with Reduced Stray Fields" Hawksworth et al, preprint Applied Superconductivity Conference, Baltimore MD, Sep. 28–Oct. 3, 1986.

*Primary Examiner*—A. D. Pellinen
*Assistant Examiner*—David Osborn
*Attorney, Agent, or Firm*—Hill, Van Santen, Steadman, & Simpson

[57] ABSTRACT

An actively shielded, superconducting magnet of a nuclear magnetic resonance tomography apparatus has an inner coil system and an outer coil system connected in series to avoid an increase in the external field upon the quench of one of the coil systems. To avoid losing the protection of the shielding effect from external magnetic field disturbances, a superconducting current limiter having a low critical current-carrying capability is connected in the coil system to guide a difference current between the inner coil system and the outer coil system. To avoid an unwanted increase in the external field in the event of a quench of one of the coil systems, the current limiter becomes normally conductive in the presence of a current difference larger than a prescribed value.

8 Claims, 1 Drawing Sheet

ACTIVELY SHIELDED, SUPERCONDUCTING MAGNET OF AN NMR TOMOGRAPHY APPARATUS

BACKGROUND OF THE INVENTION

1. Field of the Invention

The present invention is directed to magnet systems suitable for use in a nuclear magnetic resonance tomography apparatus, and in particular to a coil system for such an apparatus having an inner coil system and an outer coil system connected in series with opposite magnetic field directions, and a superconducting permanent current switch bridging the two coil systems.

2. Description of the Prior Art

A uniform fundamental or basic magnetic field is required for examination of a subject using the principles of nuclear magnetic resonance imaging. The nuclear spins of a subject disposed within the examination volume of the magnet are given a preferred direction by the fundamental magnetic field. Irradiation of the patient with an rf pulse, and the action of selected gradient magnetic fields, cause the nuclear spins to deviate from the preferred direction with a frequency and phase coding which permit a topical resolution of the examination subject to be made. After the action of the rf pulse and the gradient magnetic fields, the nuclear spins gradually re-orient to the preferred direction. The signals generated during this re-alignment are received by an antenna, and are supplied to an evaluation circuit which constructs a displayable image of the examination subject from these signals.

A superconducting coil system which surrounds the cylindrical examination volume can be used to generate the uniform magnetic field. Superconducting coils are of particular advantage when high fundamental field strengths are needed. The field strength in the examination volume of the superconducting coils usually is between 0.5 and 4 T.

Superconducting coils are frequently comprised of a plurality of individual coils, and can unintentionally convert into a normally conducting condition, commonly referred to as a quench. The rapid increase in impedance associated with a quench causes the energy stored in the coil system to be rapidly converted into heat in the coil, or in a region of the coil. Because the superconductor has a low heat capacity, the superconductor heats to an extremely pronounced degree, and thus experiences a further increase in impedance due to the heating. In addition to the heating, electrical over voltages can lead to the destruction of the insulation of the superconductor.

Many structures and methods are known in the art to prevent such unwanted quenching. Anti-quench measures are described, for example, in German OS No. 23 01 152, which uses ohmic protective resistances for this purpose. The use of semiconductor diodes for the same purpose is described in German OS Nos. 16 14 964 and 17 64 369. The semiconductor diodes are connected in parallel with the individual coils to limit the voltage.

These known anti-quench devices do not carry current in the superconducting operative condition. When a coil converts to the normally conducting condition, the anti-quench device accepts a portion of the current, and thus limits the voltage across the coil. The anti-quench device also accepts a part of the energy converted into heat. Because the energy stored in the coil system can be several million joules, it is desireable, in order to maintain the physical dimensions of the anti-quench device within a reasonable range, to convert the entire coil system to its normally conducting system under such circumstances, so that the energy stored in the coil system can be uniformly distributed and converted into heat over the entire coil system.

It is therefore known in the art to induce quench propagation when one region of a superconductor is quenched. Such a structure is described in European Application No. 0 115 797. In this system, the voltage of a network of anti-quench resistors is passively supplied to heating elements which are arranged in good thermally conducting contact with the coil system.

It is also possible to supply voltage from a power pack to the heating elements under the control of quench detectors. The heat generated by the heating elements cause the superconducting coil system to convert to its normally conducting condition, so that a uniformly distributed energy conversion is achieved.

A high external stray field is associated with the high field strengths in the inside of the coil system. To prevent unwanted interaction of this external field with magnetizable bodies and electronic systems in the area, the external field must be reduced to a low field strength. It is theoretically possible to shield the coil system from the surrounding area by ferromagnetic materials.

Another shielding approach is to provide a second coil system, which surrounds a first coil system, and which has a magnetic field direction opposite to that of the fundamental magnetic field. Such an actively shielded, superconducting coil system is described in U.S. Pat. No. 4,595,899 and in the article "Considerations in the Design of MRI Magnets With Reduced Stray Fields," Hawksworth et al, Applied Superconductivity Conference, Sept. 28–Oct. 3, 1986.

This type of active shielding significantly reduces the external magnetic field in the environment of the superconducting magnet. The area around the superconducting magnet having unsafe magnetic field levels for magnetizable bodies and electronic systems is thus also considerably reduced, producing a lower space requirement for the NMR system.

The inner coil system and the outer coil system may be separate circuits, or may form a common circuit. If the inner and outer coil systems are separate circuits, this compensates for chronologically varying external magnetic fields inside the respective coil systems due to a current change, because the magnetic flux $\Phi$ is constant in a closed superconducting circuit because the electric field E cannot have any component along the superconductor. This is expressed in the equation $$-\frac{\partial \Phi}{\partial t} = -\frac{\partial}{\partial t} \int_A^B \vec{B} \cdot d\vec{f} = \int_U^E \vec{E} \cdot d\vec{s} = 0$$

wherein A is the cross-sectional area of the circuit, and U is the circumference of the circuit.

A change in the magnetic induction B of the field strength is therefore compensated by a current change in the superconductor. Essentially uniform, external magnetic field changes which, for example, are caused by moving magnetizable bodies such as automobiles and street cars thus do not cause any change in the inner, uniform fundamental magnetic field, assuming that the inner coil system is designed such that it alone generates the uniform magnetic field. A disadvantage of the use of such separate circuits for the two coil systems is that the external field may be undesireably increased if only one of the two coil systems converts to the normally conducting condition.

For safety reasons, both coil systems are therefore connected in series in actively shielded magnets of this type. Upon the quench of one of the coil systems, the current in the entire circuit, and thus the external field, are reduced. The disadvantage of this interconnection of the systems is that the inner fundamental magnetic field is no longer insulated from external magnetic field disturbances. Upon the occurrence of magnetic field changes which effect a current change, only the magnetic flux in the annular gap between the coil systems stays constant because, due to the series connection of the coil systems, only this annular gap is surrounded by a closed, superconducting circuit. The necessary constancy of uniformity of the fundamental magnetic field is thus no longer insured.

SUMMARY OF THE INVENTION

It is an object of the present invention to provide an actively shielded, superconducting magnetic system which avoids an increase in the external field upon the occurrence of a quench, and also shields the inner field from chronologically variable external magnetic fields.

The above objects are achieved in accordance with the principles of the present invention in a superconducting coil system having a superconducting current limiter with a low critical current that bridges one of the two coil systems. The current limiter can carry a difference current between the inner and outer coil systems, and becomes normally conducting when a predetermined difference current is exceeded. The current difference between the inner coil system and the outer coil system is thereby limited.

An advantage of this structure is that the current limiter permits slight current differences to exist between the inner and outer coil systems. As a result, magnetic field disturbances within each coil system, particularly within the inner coil system, can be compensated by a current modification. When the current difference between the two coil systems exceeds the critical current of the current limiter, the current limiter becomes normally conducting, and thus limits the current difference between the coil systems. Approximately the same current flows in both coil systems, so that the magnetic fields of both coil systems substantially cancel each other toward the exterior of the total system, even in the event of a quench. An unwanted increased external field is thus suppressed.

The system may also be provided with means for inducing quench propagation as a precautionary measure against destruction of the coil systems.

The superconducting current limiter preferably has a high resistance per unit length in the normally conducting condition to achieve a high resistance for the difference currents while maintaining the structural size and manufacturing outlay low.

To avoid separately manufacturing the current limiter, in a preferred embodiment at least a single filament of a superconductor is used as the current limiter, which can be acquired by etching the matrix off of a superconductor assembly.

It is desirable that the current limiter itself does not generate any magnetic field, and does not have any disturbing inductivity. Therefor it is preferable that the superconductor current limiter be wound in bifilar e.g. (twisted pair) fashion.

It is also preferable to provide means for intentionally bringing the current limiter to the normally conducting condition, which is useful upon excitation of the magnet system.

DESCRIPTION OF THE PREFERRED EMBODIMENTS

Figure 1:
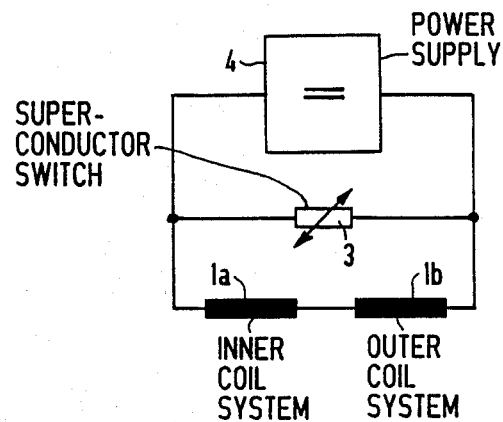
FIG. 1 is a schematic representation of a known actively shielded, superconducting magnet system.

The known system shown in FIG. 1, corresponding to conventional systems described above, has an inner coil system $1a$ and an outer coil system $1b$. Each of the coil systems $1a$ and $1b$ may consist of a plurality of individual coils.

In this known arrangement, the inner coil system $1a$ and the outer coil system $1b$ are connected in series, and can be shorted with a superconducting permanent current switch 3. A power supply, such as a power pack 4, is connected in parallel with the switch 3. The coil systems $1a$ and $1b$ are supplied with a steadily increasing current from the power supply 4 during charging. The permanent current switch 3 is switched to a normally conductive condition, and thus carries only a slight, constant current in comparison to the superconducting parallel branch formed by the coil systems $1a$ and $1b$. When the desired field strength is reached, the switch 3 is converted to its superconducting condition, so that the superconducting circuit is closed via the switch 3.

Figure 2:
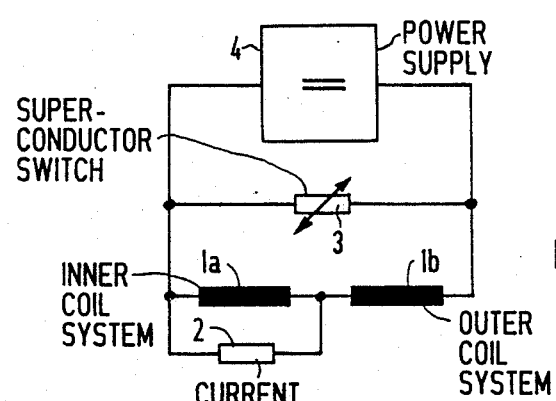
FIG. 2 is a schematic representation of an actively shielded, superconducting magnet system constructed in accordance with the principles of the present invention.
Figure 3:
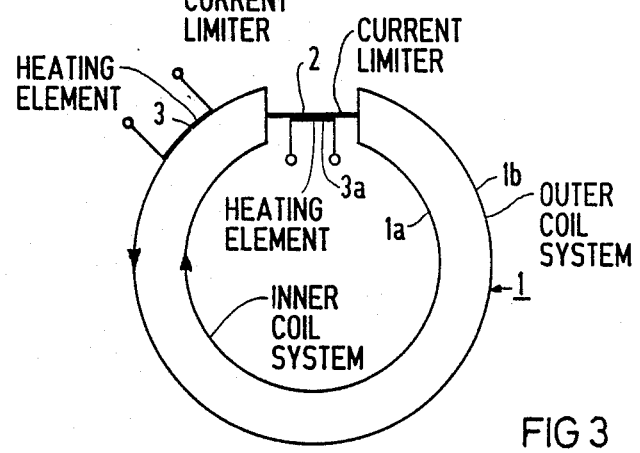
FIG. 3 is a simplified representation of the arrangement of the components in an actively shielded, superconducting magnet system constructed in accordance with the principles of the present invention.

In the system constructed in accordance with the principles of the present invention shown in FIGS. 2 and 3, two coils systems $1a$ and $1b$ are also present, however a current emitter 2 is connected in parallel with one of the coil systems so that the external stray field is maintained low upon the occurrence of a quench, and external magnetic field disturbances are shielded from the coils $1a$ and $1b$ during normal operation.

As shown in the drawings, the series connection of the inner coil system $1a$ and the outer coil system $1b$ can be shorted, as in the prior art, via a superconducting permanent current switch 3. The power supply 4 is connected in parallel with the switch 3. The current limiter 2 is connected in parallel with the inner coil system $1a$. As described above in connection with FIG. 1, the system shown in FIG. 2 is operated by charging the coil systems $1a$ and $1b$ with a steadily increasing current from the power supply 4. As long as the current limiter 2, which has a low-inductivity in comparison to the coil systems, is superconducting, substantially no voltage drop will occur across the current limiter 2, so that the coil system $1a$ cannot accept any current as a consequence of its own inductivity. As soon as the current across the current limiter 2 exceeds the critical value, the current limiter 2 becomes normally conducting, and the coil system 1a accepts the current. As soon as the current is fixed at a constant value, there will be no voltage drop across the coil system 1a, and the current limiter again becomes superconducting, so that the coil system 1a and 1b forms its own superconducting circuit wherein the flux is maintained. Magnetic field changes in the inner coil system 1a and in the outer coil system 1b are compensated by appropriate current changes in the respective circuit. The slight current differences which may arise flow across the current limiter 2.

Upon the occurrence of current reduction due to a quench in the coil systems 1a or 1b, the difference between the currents in the inner coil system 1a and the outer coil system 1b exceeds the critical current of the current limiter 2. This causes the current limiter 2 to become normally conducting, and thus limits the current difference to a relatively low value. The increase in the external field, which would otherwise occur, is thus prevented.

Anti-quench measures are also provided in the coil system generally referenced 1 in FIG. 3 which convert the entire coil system 1 into the normally conducting condition given a quench of a coil or a coil system 1a or 1b. Such anti-quench measures are not specifically shown in detail in FIGS. 2 and 3. It is not possible to use anti-quench measures of the type described above in the form of protective resistances or semiconductor diodes because these cannot be allocated to the individual coil systems 1a and 1b. If a quench occurs within one of the coil systems 1a or 1b, such anti-quench measures can only accept a difference current between the inner coil system 1a and the outer coil system 1b, as is the case in the prior art shown in FIG. 1. This difference current can, however, result in an undesirably high external field. The actively shielded, superconducting coil system of the present invention is therefore provided with means for inducing quench propagation such as, for example, heating elements, one of which is shown in FIG. 3 referenced at 3. Upon the occurrence of a quench of a coil, the heating elements such as a the heating element 3 are driven either actively or passively, for example inductively, so as to convert the entire coil system to its normally conducting condition. A circuit of this type described in German Patent Application No. 37 10 519.1 may be used for this purpose.

To prevent destruction of the current limiter 2, the normally conducting resistance of the current limiter 2 follows the maximum occurring voltage during a quench, taking the antiquench measures into consideration. If, due to a quench, the current limiter 2 converts to its normally conducting condition, an extremely high voltage drop can occur across the current limiter 2 if the anti-quench measures fail. Such a voltage could potentially destroy the current limiter 2. Even if destruction of the current limiter 2 occurs, however, this only results in the loss of the shielding from external magnetic disturbances. The external field generated by the coil systems 1a and 1b still does not increase, because those systems under those conditions form a common circuit in which the same current flows.

Upon the occurrence of an intentional current change in the overall coil system as occurs, for example, when it is desired to change the field strength, the current limiter 2, for excitation purposes, becomes normally conducting as soon as the current difference between the inner coil system 1a and the outer coil system 1b exceeds its critical current. The current limiter 2 again becomes superconducting when the current change is completed. To avoid current differences between the coil systems 1a and 1b, the current limiter can have a heater 3a integrated therewith which maintains the current limiter 2 in the normally conducting condition during the entirety of the excitation procedure as a result of the elevated temperature provided by the heater, thereby facilitating a precise field setting.

Figure 4:
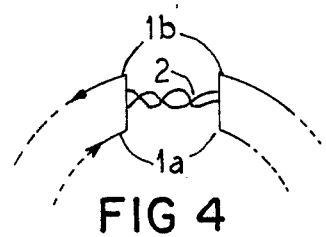
FIG. 4 is a schematic representation of a portion of a superconducting magnet system constructed in accordance with the principles of the present invention showing a bifilar wound current limiter.

The current limiter 2 is preferably wound in bifilar fashion, as shown (exaggerated) in FIG. 4. Although modifications and changes may be suggested by those skilled in the art it is the intention of the inventor to embody within the patent warranted hereon all changes and modifications as reasonably and properly come within the scope of his contribution to the art.

I claim as my invention:

1. An actively shielded, superconducting magnetic system comprising:
   an inner magnetic coil system operable in a superconducting state;
   an outer magnetic coil system operable in a superconducting state connected in series with said inner magnetic coil system and having a magnetic field direction opposite to said inner magnetic coil system;
   a superconducting permanent switch connected across said inner and outer coil systems in series; and
   current limiter means connected across one of said inner or outer magnetic coil systems for carrying a difference current between said inner and outer magnetic coil systems at least during normal operation in a superconducting state of said inner and outer magnetic coil systems, said current limiter means consisting of superconductor material and becoming normally conductive when a predetermined difference current is exceeded to thereby limit the current difference between said inner magnetic coil system and said outer magnetic coil system.

2. An actively shielded, superconducting magnetic system as claimed in claim 1, wherein said current limiter means is connected across said inner magnetic coil system.

3. An actively shielded, superconducting magnetic system as claimed in claim 1, further comprising means for inducing quench propagation in at least one of said inner or outer magnetic coil systems.

4. An actively shielded, superconducting magnet system as claimed in claim 1, wherein said current limiter means consists of material having high resistance per unit length in said normally conducting condition.

5. An actively shielded, superconducting magnet system as claimed in claim 4 wherein said current limiter means consists of at least one filament of superconducting material.

6. An actively shielded, superconducting magnet system as claimed in claim 1, wherein said current limiter means consists of bifilar wound super-conductor material.

7. An actively shielded, superconducting magnet system as claimed in claim 1, further comprising means for bringing said current limiter means to said normally conducting condition independently of said difference current.

8. An actively shielded, superconducting magnetic system as claimed in claim 1, wherein said current limiter means is connected across said outer magnetic coil system.

* * * * *